United States Patent [19]

Tsao et al.

[11] Patent Number: 4,472,517
[45] Date of Patent: Sep. 18, 1984

[54] PREPARATION OF METAL-CONTAINING ZEOLITE CATALYSTS OF INCREASED STABILITY AND ACTIVITY

[75] Inventors: Ying-Yen P. Tsao; Stephen S. Wong, both of Langhorne, Pa.

[73] Assignee: Mobil Oil Corporation, New York, N.Y.

[21] Appl. No.: 465,854

[22] Filed: Feb. 11, 1983

[51] Int. Cl.$^3$ .......................... B01J 29/10; B01J 29/28
[52] U.S. Cl. ........................................ 502/62; 502/74; 502/77
[58] Field of Search ....................... 502/74, 77, 78, 79, 502/62

[56] References Cited

U.S. PATENT DOCUMENTS 3,200,083  8/1965  Milton .................................. 502/74

OTHER PUBLICATIONS

"Metal-Zeolite Catalysts" by Minachev et al., Zeolite Chemistry and Catalysis–Jule A. Rabo, ACS, Washington, D.C., 1976, pp. 555–573.

Primary Examiner—Carl F. Dees
Attorney, Agent, or Firm—A. J. McKillop; M. G. Gilman; J. F. Powers, Jr.

[57] ABSTRACT

A method of incorporating metals onto a crystalline aluminosilicate zeolite support comprises first depositing a metal which forms bonds with the zeolite and subsequently depositing a catalytically active metal into the zeolite which becomes associated with the first metal. Both metals may be introduced by decomposition of organometallic complexes such as allyl complexes.

11 Claims, No Drawings

PREPARATION OF METAL-CONTAINING ZEOLITE CATALYSTS OF INCREASED STABILITY AND ACTIVITY

BACKGROUND OF THE INVENTION

1. Field of the Invention

This invention relates to a novel method of preparing metal-containing zeolite catalysts and to metal-containing zeolite catalysts of increased stability and activity prepared thereby.

2. Description of the Prior Art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid 3-dimensional network of $SiO_4$ and $AlO_4$ in which the tetrahedra are cross-linked by the sharing of oxygen atoms whereby the ratio of the total aluminum and silicon atoms to oxygen is 1:2. The spaces between the tetrahedra are occupied by molecules of water prior to dehydration. The electrovalence of the tetrahedra containing aluminum is balanced by the inclusion in the crystal of a cation, for example, an alkali metal or an alkali earth metal cation. This can be expressed by the formula wherein the ratio of Al to the number of the various cations such as Ca/2, Sr/2, Na, K or Li, is equal to unity. One type of cation can be exchanged either entirely or partially by another type of cation using ion exchange techniques in a conventional manner. By means of such cation exchange, it has been possible to vary the size of the pores in the given aluminosilicate by suitable selection of the particular cation.

The catalytic properties of metal-loaded aluminosilicates as is well known, have been demonstrated to be extremely important to petroleum, chemical and enzymatic reactions. The aluminosilicates have been activated, i.e., metal loaded for these reactions by methods employing impregnation, vapor deposition and base-exchange of the desired metal to be loaded. The use of aqueous solutions, especially those of polyvalent metal salts, is the standard method employed to exchange the metals into the crystalline aluminosilicate structure. The resulting wet metal-containing crystalline aluminosilicate zeolite is thereafter dried and subsequently subjected to a thermal treatment. The finished catalyst contains the metal component distributed in the zeolitic structure in metallic form.

Zeolites which have been loaded with metals according to the above-described conventional method are subject to substantial limitations. In particular, the metals incorporated in such zeolites may not be adequately anchored within the zeolite channels. Under the severe conditions of temperature and pressure encountered in catalysis, the incorporated metals migrate out of the pores of the zeolite to the zeolite surface. A reducing atmosphere and the presence of hydrocarbon exacerbates this migration.

Supported metal atoms are known to be bound to the support by Van der Waal's force, approximately 5 Kcal/g atoms. Increasing the number of metal atoms in a cluster results in an increase in the bonding energy of the metals to the support. Thus, metal atoms migrate easily to form clusters, especially at elevated temperatures when the mobility of these atoms is especially high.

Metal migration can be reduced by increasing the energy of interaction between the metal and the support. For example, it has been demonstrated that by using low valent metals, e.g. Pb or Sn, or early transition metals, e.g. Mo, W, Re, as a stabilizing center or anchored center on amorphous oxide supports such as $SiO_2$ and $Al_2O_3$, the binding energy between the metal atoms and the support, through the stabilizing center can be increased. An example of such a catalyst system can be represented as follows:

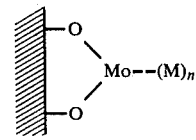

wherein Mo is the stabilizing center and M is the metal or metals being supported. It has been shown that metal to metal binding in bi-nuclear organometallic complexes can reach as high as 80 Kcal/mole.

The amorphous oxide supported metal catalysts with anchored center have also been shown to provide better metal dispersity and activity than the conventional metal-exchanged catalysts. For example, the activity for benzene hydrogenation was increased by 10 fold when Re or Mo was used as an anchored center for platinum metal. A more dramatic increase of $10^4$ fold in Pt activity for ethane hydrogenalysis was obtained with W as an anchored or stabilizing center on a $SiO_2$ support. Organometallic complexes, such as allyl complexes have been utilized to introduce both the stabilizing center and the catalytically active metal or metals within the support. The above process is more fully disclosed in "Hydrogenolysis of Ethane on Supported (Mo+Pt)-/$SiO_2$ Catalysts," Yermakov et al, *Journal of Catalysis*, 42, 73-78 (1976), herein incorporated by reference.

SUMMARY OF THE INVENTION

Among the principle objectives of this invention is to provide a method of incorporating metallic elements into the crystalline aluminosilicate zeolite structure and to produce thereby metal-containing zeolite catalysts of increased stability and activity. In accordance with the present invention, there has been discovered a new and improved method of preparing metal-loaded crystalline aluminosilicates suitable for use as catalysts in a wide variety of hydrocarbon conversion processes including hydrogenation, dehydrogenation, reforming, cracking, including hydrocracking, alkylation, isomerization, polymerization, dealkylation, dewaxing, olefinic production, among other possible hydrocarbon conversions. The method of preparing the metal-containing zeolite catalysts comprises first depositing a stabilizing or anchored center (a Group IVA metal or early transition metal) into the crystalline zeolite support and subsequently introducing the catalytically active metal or metals. The stabilizing center and the active metal or metals are introduced into the zeolite via the decomposition of organometallic complexes. It is believed that the strong bonding between the stabilizing center and the active metal or metals prevents metal migration even at elevated temperatures.

DESCRIPTION OF SPECIFIC EMBODIMENTS

The crystalline aluminosilicate employed in the preparation of the metal-containing catalyst compositions of the present invention are of ordered internal structure and have a pore size ranging between about 4 and 15 Angstrom units. They may be either natural or synthetic. Illustrative of preferred zeolites are faujasite, erionite, mordenite, chabazite, philipsite, gmelinite, zeolite X, zeolite Y, zeolite T, zeolite ZK-5, zeolites of the ZSM-5 family, including ZSM-5, ZSM-11, ZSM-12, ZSM-23, ZSM-35, ZSM-38 merely to list a few.

According to the invention, the method of incorporating an active metal or metals within the crystalline aluminosilicate structure comprises first depositing a stabilizing center into the zeolite support before introducing the active metal or metals. By utilizing the stabilizing center, the binding energy between the catalytically active metal atoms and the support, through the stabilizing center can be greatly increased. The stabilizing center can be selected from metals such as those from Group IVA, e.g., low valent lead or tin, or early transition metals of Groups IVB, VB, VIB and VII B, for example molybdenum, tungsten and rhenium.

The catalytically active metals which can be incorporated into the zeolite structure through the intermediate bonding of the stabilizing center include all metal elements contained in Groups I through VIII of the Periodic Table. Group VIII metals, in particular, are advantageously incorporated into the zeolite structure in accordance with the present invention. Group VIII metals are often used in hydrocarbon conversions at conditions with elevated temperatures and pressures and under a hydrogen environment, conditions which tend to increase metal migration during processing. The amount of catalytically active metal component incorporated within the crystalline structure of the aluminosilicate may vary widely and will depend upon the chargestock undergoing conversion as well as on the particular nature of the metal component. Generally, the amount of each metal component incorporated within the zeolite will be within the range of about 0.05 to 20 percent by weight. It will be understood that the amount of metal component will be such as to afford selective conversion of the portion of the charge mixture making contact with the active catalytic surfaces and undergoing conversion.

The stabilizing center and catalytic active metal or metals are preferably introduced into the crystalline structure of the aluminosilicate as organometallic complexes. The use of allyl complexes are particularly preferred, especially for introducing the stabilizing centers. Allyl complexes are preferred as the metal precursors for introducing the stabilizing center within the zeolite support for several reasons. Specifically, intrinsic in the use of allyl complexes are weak metal to ligand bonding. Additionally, extreme sensitivity of allyl complexes to hydrolysis such as by protonic acid and even through the weak hydroxyl protons on the surface of the support provides the chemical bonding between the stabilizing center and the zeolite support. Allyl complexes are of small molecular diameter and thus can penetrate into the zeolite structure of even the small pore zeolites. It is also preferred to introduce the catalytically active metal using metal allyl complexes. Additionally, other organometallic complexes with small effective molecular diameters and with $\pi$-electron donating ligands, e.g. dimethyl platinum cyclo-octadiene, are useful.

The following examples illustrate the preparation of metal-containing zeolites in accordance with the method of the present invention.

EXAMPLE 1

0.12 g of tetra-allyl molybdenum was dissolved in 20 ml of degassed pentane. 5 g of $NH_4ZSM$-5 (silica/alumina ratio 70) was converted to HZSM-5 by calcining at 500° C. for 2 hours. To this HZSM-5, the pentane solution of tetra-allyl molybdenum was added. The mixture stood for 16 hours. The brown solids were filtered, washed with $2 \times 10$ ml of degassed pentane, and dried in vacuum for 1.5 hours. These solids were then treated with 100 cc/min of $H_2$ at 600° C. for 3 hours. 0.27 g of bis-allyl palladium in 20 ml of degassed pentane was added to these $H_2$ reduced solids. After the pentane solvent was removed under vacuum, the resultant solids were reduced by 100 cc/min of $H_2$ at 600° C. for 2 hours. These final bimetallic solids were dark grey in color. The Mo and Pd metal loadings were 0.82% and 3.1%, by weight, respectively.

EXAMPLE 2

0.056 g of tetra-allyl molybdenum in 15 ml of pentane was added to 3 g of HZSM-Beta (silica/alumina ratio 150). The mixture stood for 16 hours. The light brown solids were filtered, washed with $2 \times 10$ ml of degassed pentane, and then dried under vacuum for 2 hours. These solids were treated with 100 cc/min of $H_2$ at 600° C. for 3 hours to obtain purple color solids. To these solids, 0.133 g of dimethyl platinum cyclo-octadiene in 20 ml of pentane was introduced. The mixture stood for 2 days. After the removal of pentane under vacuum, the resultant black solids were analyzed for their Pt and Mo loadings which were found to be 2.6% and 0.69% respectively.

What is claimed is:

1. A method of introducing a catalytically active metal into a crystalline aluminosilicate zeolite which comprises contacting said zeolite with a metal allyl complex of Group IVA, Group VIB or Group VIIB metals to deposit said metal as a stabilizing center into said zeolite and subsequently contacting said zeolite with a metal allyl complex of said catalytically active metal whereby said catalytically active metal is bound to said zeolite through said stabilizing center.

2. The method of claim 1 wherein said catalytically active metal is a Group VIII metal.

3. The method of claim 1 wherein subsequent to introducing said metal allyl complex of said stabilizing center, the resulting zeolite is contacted with hydrogen to remove the organic ligands from said complex.

4. The method of claim 3 wherein subsequent to introducing said metal allyl complex of said catalytically active metal into said zeolite said zeolite is treated with hydrogen.

5. The method of claim 1 wherein said metal allyl complexes of said stabilizing center and said catalytically active metals are introduced in said zeolite after dissolving said complexes in a non-polar organic solvent which includes alkane, and aromatic or both.

6. The method of claim 5 wherein said organic solvent is pentane.

7. The method of claim 1 wherein said crystalline aluminosilicate zeolite comprises a zeolite of the ZSM-5 family.

8. The method of claim 1 wherein said stabilizing center is low valent lead or tin.

9. The method of claim 1 wherein said stabilizing center is molybdenum.

10. The method of claim 2 wherein said catalytically active metal is platinum or palladium.

11. The method of claim 9 wherein said catalytically active metal is platinum or palladium.

* * * * *